United States Patent
Partridge

(10) Patent No.: US 7,733,067 B2
(45) Date of Patent: Jun. 8, 2010

(54) BURST FREQUENCY RESONANT INVERTER

(75) Inventor: Donald Partridge, Los Gatos, CA (US)

(73) Assignee: One More Time LLC, Los Gatos, CA (US)

( * ) Notice: Subject to any disclaimer, the term of this patent is extended or adjusted under 35 U.S.C. 154(b) by 0 days.

(21) Appl. No.: 12/332,205

(22) Filed: Dec. 10, 2008

(65) Prior Publication Data

US 2009/0154199 A1  Jun. 18, 2009

Related U.S. Application Data

(60) Provisional application No. 61/007,757, filed on Dec. 14, 2007.

(51) Int. Cl.
 *G05F 1/10* (2006.01)
(52) U.S. Cl. ...................................... 323/222
(58) Field of Classification Search ......... 323/222–225, 323/265, 268, 271; 363/16, 21.02, 21.03
See application file for complete search history.

(56) References Cited

U.S. PATENT DOCUMENTS 4,928,038 A * 5/1990 Nerone ................... 315/209 R
4,931,716 A * 6/1990 Jovanovic et al. ............ 323/285
6,144,565 A * 11/2000 Lethellier ..................... 363/16
7,095,630 B2 * 8/2006 Weber .......................... 363/16
2005/0109748 A1    5/2005 Albrecht et al.

FOREIGN PATENT DOCUMENTS

JP       02-044683      2/1990
JP       05-109468      4/1993
JP       08-234621      9/1996

OTHER PUBLICATIONS

PCT Notification of Transmittal of the International Search Report and the Written Opinion of the International Searching Authority or the Declaration for PCT Counterpart Application No. PCT/US2008/013647 Containing International Search Report, 12 pages (Apr. 9, 2009).

* cited by examiner

*Primary Examiner*—Matthew V Nguyen
(74) *Attorney, Agent, or Firm*—Blakely, Sokoloff, Taylor & Zafman LLP

(57) ABSTRACT

A high frequency resonant apparatus is described that includes a closed loop resonant series circuit including a capacitor, an inductor, a load, and a switching device with an anti-parallel diode. An energy source is coupled to the closed loop series circuit. The high frequency resonant apparatus also includes a controller for turning on the switching device for a time longer than one cycle of the closed loop resonant series circuit.

40 Claims, 5 Drawing Sheets

Burst rate = $1/T_B = f_B$

Burst rate = $1/T_B = f_B$

US 7,733,067 B2

BURST FREQUENCY RESONANT INVERTER

CROSS REFERENCE TO RELATED APPLICATION

The present application claims priority to U.S. Provisional Application No. 61/007,757, filed Dec. 14, 2007, which is incorporated by reference.

FIELD

Embodiments of the present invention relate generally to the field of electronic devices and circuits. More particularly, these embodiments relate to products, systems, and methods for a burst frequency resonant inverter circuit to reduce switching losses associated with high frequency resonant loads in induction heating.

BACKGROUND

A limiting factor on how high of a frequency resonant loads can run is the combined switching losses. There are six main sources of switching losses with bipolar devices (Field Effect Transistor type devices do not have the $3^{rd}$ and $4^{th}$ losses listed). They are:
1. The voltage/current ("V/I") losses at turn on.
2. The V/I losses at turn off.
3. The conduction modulation loses at turn on.
4. The tail current losses at turn off.
5. The diode switching losses.
6. The $½CV^2$ loss when the switching device is turned on (wherein C is capacitance and V is voltage).

The V/I losses at turn on are the losses in the switching device when the voltage across the device is falling and the current is rising at the same time. In addition to the V/I losses at turn on, there are the additional losses of a high current (higher than the load current) in the switching device if a diode is being reversed biased (sweep out) at the same time the switch is being turned on.

The V/I losses at turn off are the losses in the switching device when the voltage across the device is rising and the current is falling at the same time.

The conduction modulation losses are the losses in the device just after it is turned on until the forward voltage drop across the device has fallen to its DC forward voltage rating.

The tail current losses take place at the end of the turn off time of a switching device. For most bipolar devices under most switching conditions, a point is reached at which the switching device itself determines the current decay rate and the current decays at a slower rate thereby increasing the power loss. The causes and extent of the tail current losses are complex, but tail current losses are generally due to charges stored in the bipolar devices due to minority carrier injection that occurs when the device is first turned on.

The diode switching losses are typically very high and occur when the diode is reversed biased (sweep out) with current in the diode when the switching device is turned on.

The $½CV^2$ loss when the switching device is turned on is due to the device absorbing energy stored in the capacitance across the device just before being turned on.

SUMMARY

A high frequency resonant apparatus is described. The apparatus includes a closed loop resonant series circuit including a capacitor, an inductor, a load, and a switching device with an anti-parallel diode. An energy source is coupled to the closed loop series circuit. The apparatus includes a controller to turn on the switching device for a time longer than one cycle of the closed loop resonant series circuit.

Other features and advantages of the present invention will be apparent from the accompanying drawings and from the detailed description that follows below.

BRIEF DESCRIPTION OF DRAWINGS

The present invention is illustrated by way of example and not limitation in the figures of the accompanying drawings, in which like references indicate similar elements, and in which.

DETAILED DESCRIPTION

A burst frequency resonant inverter can be used for induction heating applications. Induction heating includes placing a conducting material inside a coil of wire, with an alternating current running through the wire. The conducting material will heat up if the alternating current is high enough in frequency. The power delivered from a resonant load inverter has been limited by the frequency at which it is operated. A limiting factor has been the switching losses in the inverter. Without de-rating below the maximum current rating of an insulated-gate bipolar transistor ("IGBT"), prior resonant load inverters were limited to approximately 50 kHz in operating frequency.

An embodiment of the invention, as presented herein, solves the frequency limit problem and operates at a current above the maximum specified in the data sheet. The new practical frequency limit, without de-rating, will be in the order of 500 kHz.

Additionally, prior resonant load inverters experienced switching losses twice each cycle of operation. For example, if running at 20 kHz, there were switching losses at a rate of 40 KHz. An embodiment of the invention, as presented herein, experiences switching losses only at approximately a 2 kHz rate when running at 20 kHz. Furthermore, the switching losses, when they occur, are only 1/10 to 1/100 of the switching losses in the prior art.

Embodiments of a burst frequency resonant inverter, as presented herein, significantly reduce the six main sources of switching losses. An embodiment of the invention not only works with devices that can be turned off at any time, but also works with silicon controlled rectifiers ("SCR"), which have to be reversed biased for a length of time to be turned off.

An embodiment of the invention is comprised of a charge capacitor connected in a closed loop series circuit with an inductor, a load (if the inductor does not include an induction heating type load), and a switching device with an anti-parallel diode. By turning on the switching device and letting the resonant load continuously ring down to a small percentage of it original voltage before turning the switching device off, numerous cycles of the resonant load are created with no switching losses. Furthermore, even the switching losses that occur when operating at a frequency lower than the resonance frequency (burst frequency) are reduced to near zero. This is due to the lack of current in the load when the switching device is first turned on and the low voltage when the switching device is turned off. The switching losses due to turning off the burst frequency inverter, both diode and switching device losses, are very low.

Figure 1A:
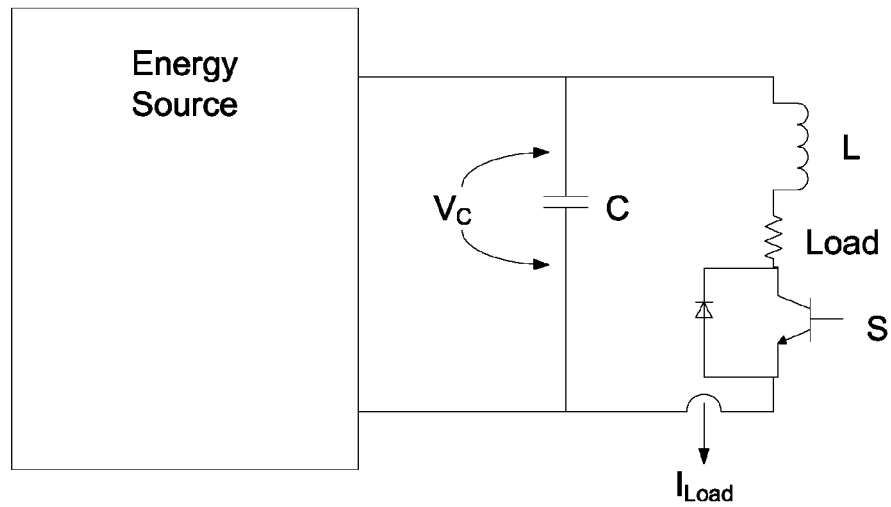
FIG. 1A shows a schematic diagram that includes a series closed loop connection of a capacitor, inductor, load, and switching device with an energy source to recharge the capacitor according to one embodiment of the invention.
Figure 1B:
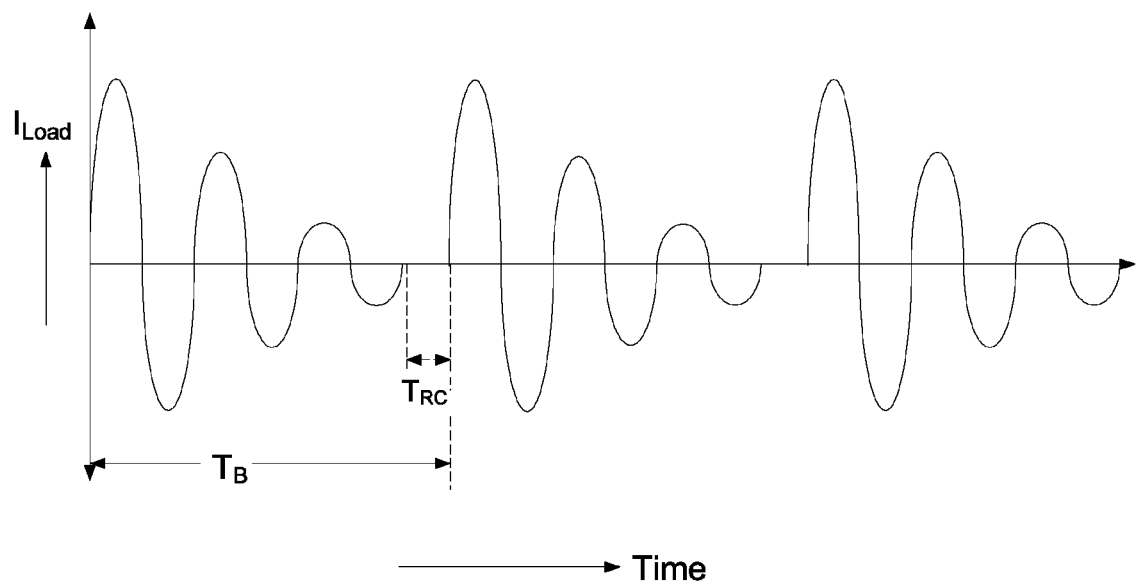
FIG. 1B shows a graph mapping the load current waveform over time in the switching device with a resonant version of the energy source according to one embodiment of the invention.

FIG. 1A shows a closed loop series circuit of a capacitor, inductor, load (if not an induction heating load), and a switch with an anti-parallel diode according to an embodiment of the invention. For one embodiment, the load is included within inductor as an induction heating type load. For an alternate embodiment, the load is the primary of a transformer that feeds other circuitry. In parallel with the capacitor is an energy source that supplies energy to the series connected circuit at least during a portion of each cycle of operation of the burst frequency topology. FIG. 1B shows the load current waveform when using a resonant energy source according to an embodiment of the invention.

One cycle of operation of the circuit of FIG. 1A is as follows. The cycle starts with the capacitor charged to voltage $V_C$. The switch S is turned on and a resonant signal is created. The switch S is left on until the current in the series resonant circuit decays down to a small percentage of its original value at the start of the burst cycle and then is turned off. FIG. 1B shows three exemplary cycles. While FIG. 1B illustrates three exemplary cycles, an embodiment of the invention could be used to generate more or less than three such cycles. After the switch S has been turned off, the capacitor charges back up to $V_C$ volts and the cycle is repeated. The power delivered to the load is determined by how often the cycle described above is repeated. The approximate power to the load is the following: Power to load=$\frac{1}{2}CV^2 f_B$, wherein V is the voltage across the capacitor at the beginning of the cycle, $f_B$ is the frequency of the decay cycle (burst frequency), and C is the value of the capacitance.

Figure 2A:
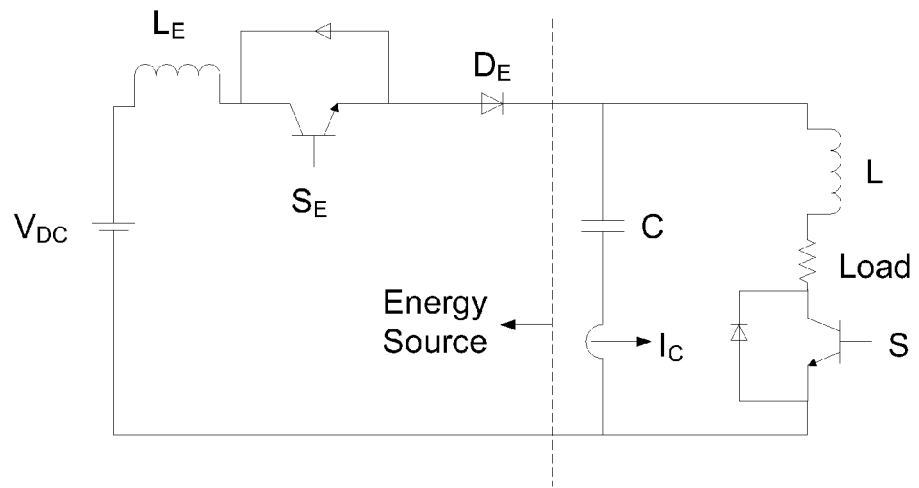
FIG. 2A shows a schematic diagram that includes a detailed resonant version of the energy source according to one embodiment of the invention.

FIG. 2A shows a series circuit similar to that shown in FIG. 1A with greater detail for one embodiment a resonant energy source. The series circuit, including the load, is like that of FIG. 1A with an additional series circuit of a DC voltage source, inductor $L_E$, switch $S_E$, and diode $D_E$ (collectively the energy source) in parallel with the series circuit capacitor. The operation of the load series circuit is similar to that described above for FIG. 1A.

Figure 2B:
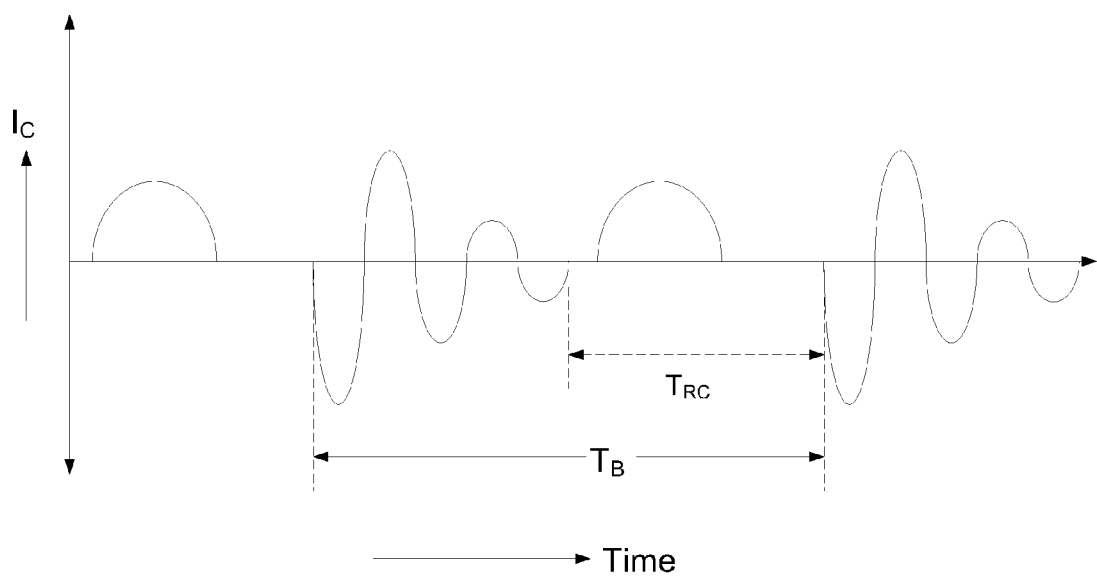
FIG. 2B shows a graph mapping the current waveform in the capacitor over time with a resonant version of the energy source according to one embodiment of the invention.

According to one embodiment of the invention, switch $S_E$ is turned off and the following takes place: After switch S has been turned off, switch $S_E$ is turned on. FIG. 2B shows the time $T_{RC}$ in which there will be a resonant current recharging of capacitor C back up to the voltage it was at the beginning of a burst cycle. The power delivered to the load is determined by how often the burst cycle is repeated.

Note that, in one embodiment, the power delivered in the load may also be controlled by varying $V_{DC}$ (the source voltage) and operating the burst control (as described above) at a fixed frequency. Under certain conditions, such as when the natural resonant frequency of the series circuit including the load is very high while running with a low equivalent impedance ("Q") circuit, this would be a preferred method of operation.

Figure 3A:
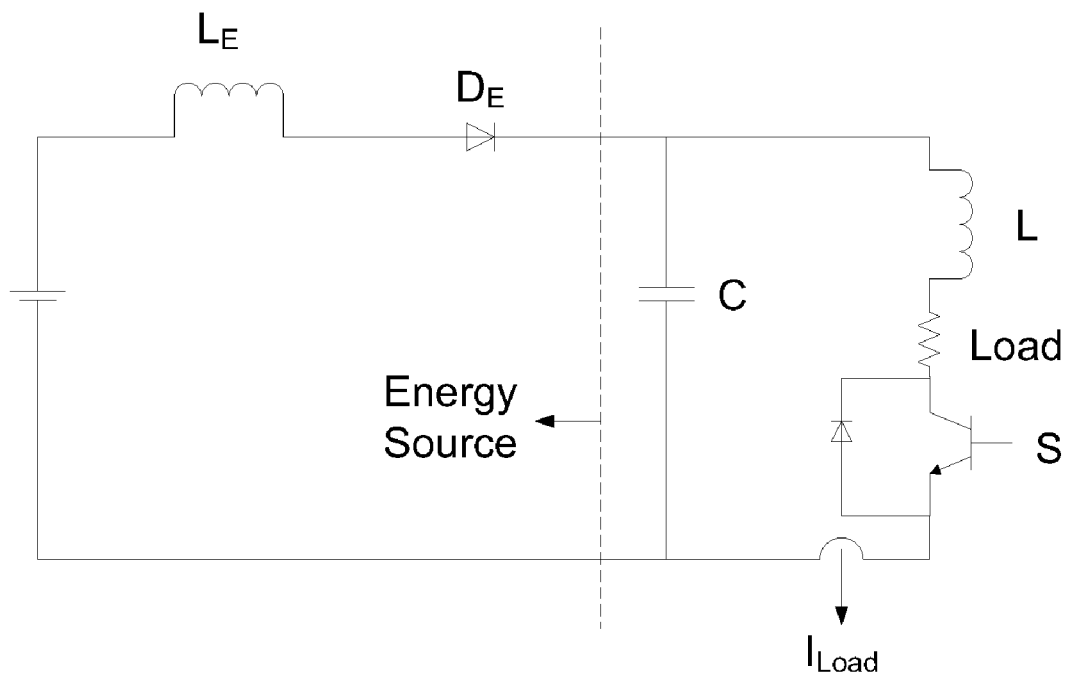
FIG. 3A shows an uncontrolled current source version of the energy source according to an embodiment of the invention.
Figure 3B:
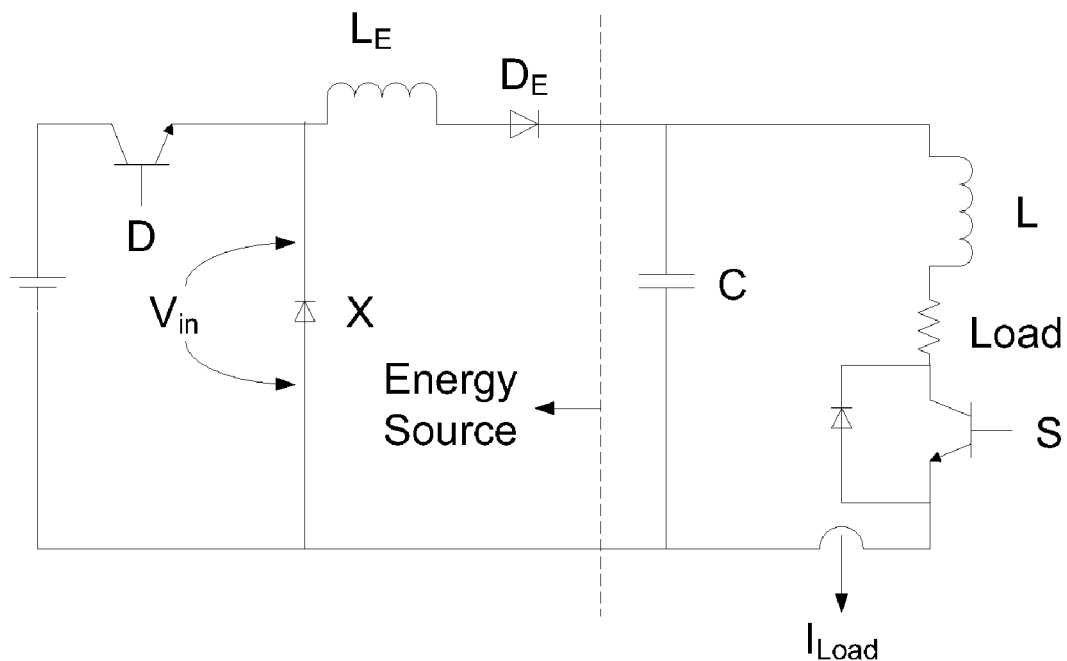
FIG. 3B shows a controlled current source version of the energy source according to an embodiment of the invention.

FIGS. 3A and 3B show two additional circuits that may be used as the energy source according to embodiments of the invention. The illustrated energy sources are exemplary. One skilled in the art could design other energy sources that would serve the same purpose. Furthermore, there are other arrangements of the combination of the energy source and series connected circuit that would serve the same purpose of being able to have a series circuit that includes the load ring for numerous cycles in order to significantly reduce the times the switch S has to be turned on and off while still generating a very high frequency.

FIG. 3A shows another type of energy source that is in parallel with the capacitor of the load resonant circuit according to an embodiment of the invention. The energy source is comprised of a series circuit of a DC source, inductor $L_E$, and diode $D_E$. This embodiment of the energy source is called an uncontrolled current source, i.e., the operation of the load series circuit determines how much current will flow in inductor $L_E$. Some embodiments do not require diode $D_E$ in the energy source.

Two modes of operation of the circuit shown in FIG. 3A will be described. They are (1) when the current is not continuous in inductor $L_E$ and (2) when the current is continuous in inductor $L_E$.

If the burst rate is low (determined by how often switch S is turned on), then the current in inductor $L_E$ will be discontinuous. At the time switch S is turned on there will be no current in inductor $L_E$. During the time that switch S is on, the current will increase in inductor $L_E$. When switch S is turned off, the current in the inductor $L_E$ will continue to flow until the voltage across the capacitor C has charged up to a sufficient voltage to reduce the current in inductor $L_E$ to zero. Under this mode of operation, the power to the load is linearly related to how often switch S is turned on. Under this mode of operation, the voltage across capacitor C will be the same each time it is turned on.

When operating in the continuous mode of operation, i.e., where the current does not return to zero before the next time switch S is turned on, the current level in inductor $L_E$ will rise to the level required so that the net volt-seconds across inductor $L_E$ will be zero during one burst cycle. Under this mode of operation, as the burst frequency increases, the voltage across capacitor C will also increase.

Figure 4:
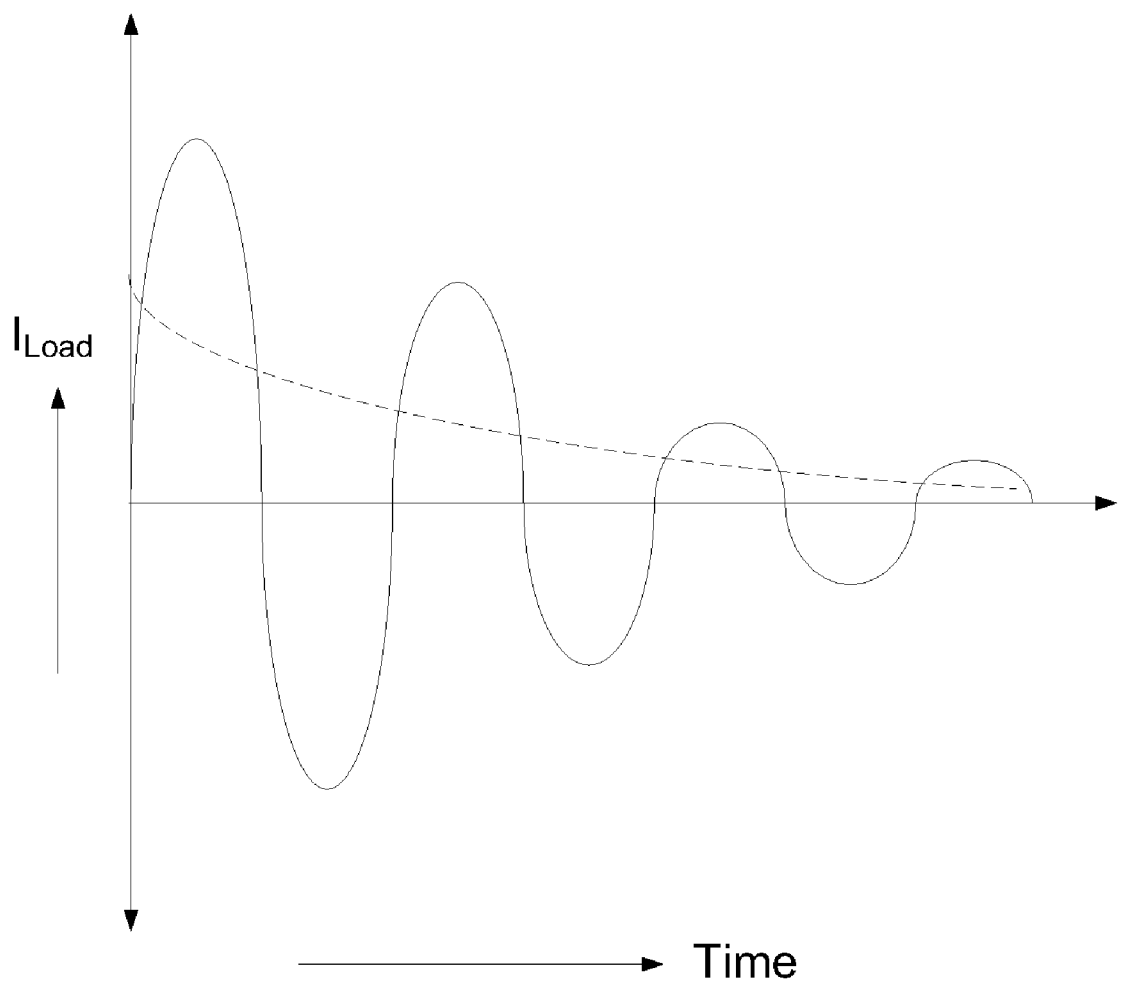
FIG. 4 shows the load current offset when using a current source type energy source according to an embodiment of the invention.

When using a current sourced energy source in an embodiment of the invention, the current waveforms will have a positive offset. The positive offset is depicted in FIG. 4.

According to an embodiment of the invention, by delaying the turn off of switch S until the resonant current in the load does not reverse through the anti-parallel diode because of the DC offset current, the diode switching loss may be further reduced in the series load circuit (which is already quite low).

FIG. 3B shows another current sourced energy source according to an embodiment of the invention. This is called a controlled current source. The controlled current source can be operated in many ways. Three of the ways it may be operated are as follows.

The first mode is similar to the circuit shown in FIG. 3A with switch D used as a solid state circuit breaker—i.e., with a load fault, switch D is turned off. Turning off switch D will stop the inverter from running. Concurrent with turning off switch D, turning on or holding on switch S for a short duration of time will prevent the circuit from being damaged.

For the second mode, switch D is controlled in a pulse width modulation ("PWM") mode to control the current in inductor $L_E$. This is especially useful when running at low load resonant frequencies to reduce the size of inductor $L_E$.

For the third mode, switch D is controlled in a PWM mode to control the average voltage across diode X ($V_{IN}$) as referenced above when running at very high frequencies and with low Q loads. This mode of operation also has advantages under other load conditions: e.g., significantly reducing the size of $L_E$ or eliminating the diode in series with $L_E$.

Figure 5A:
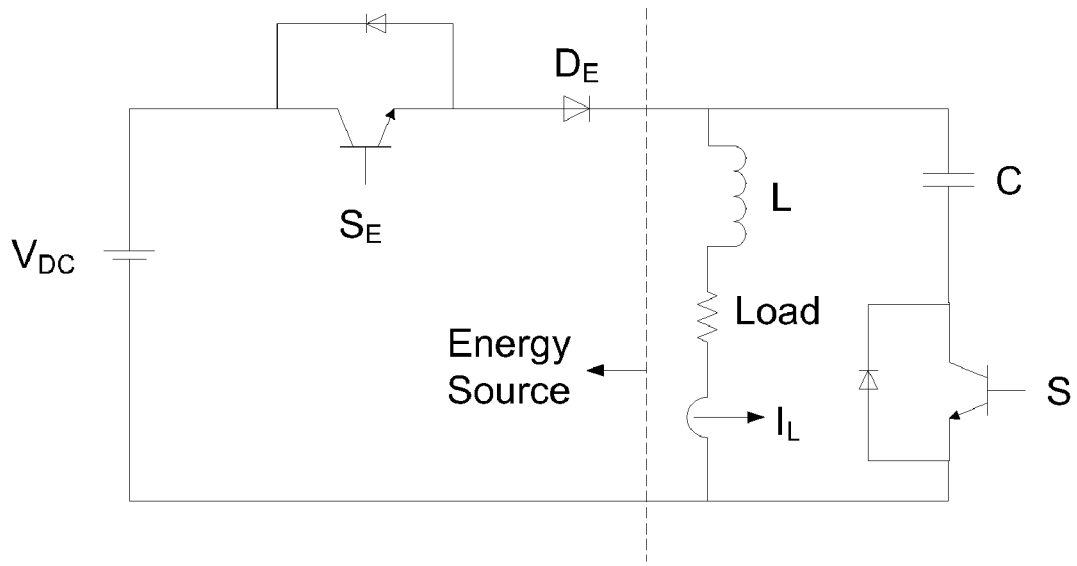
FIG. 5A shows a schematic diagram that includes a detailed version of the energy source according to an embodiment of the invention in which the inductor is pre-charged rather than the capacitor.

FIG. 5A shows a variation of the circuit of FIG. 1A, in which the inductor L is pre-charged before the resonant ring down instead of precharging the capacitor, according to an embodiment of the invention. The majority of the losses in the circuit of FIG. 1A are conduction modulation losses of switch S. The circuit of FIG. 5A has little or no conduction modulation losses in Switch S.

Figure 5B:
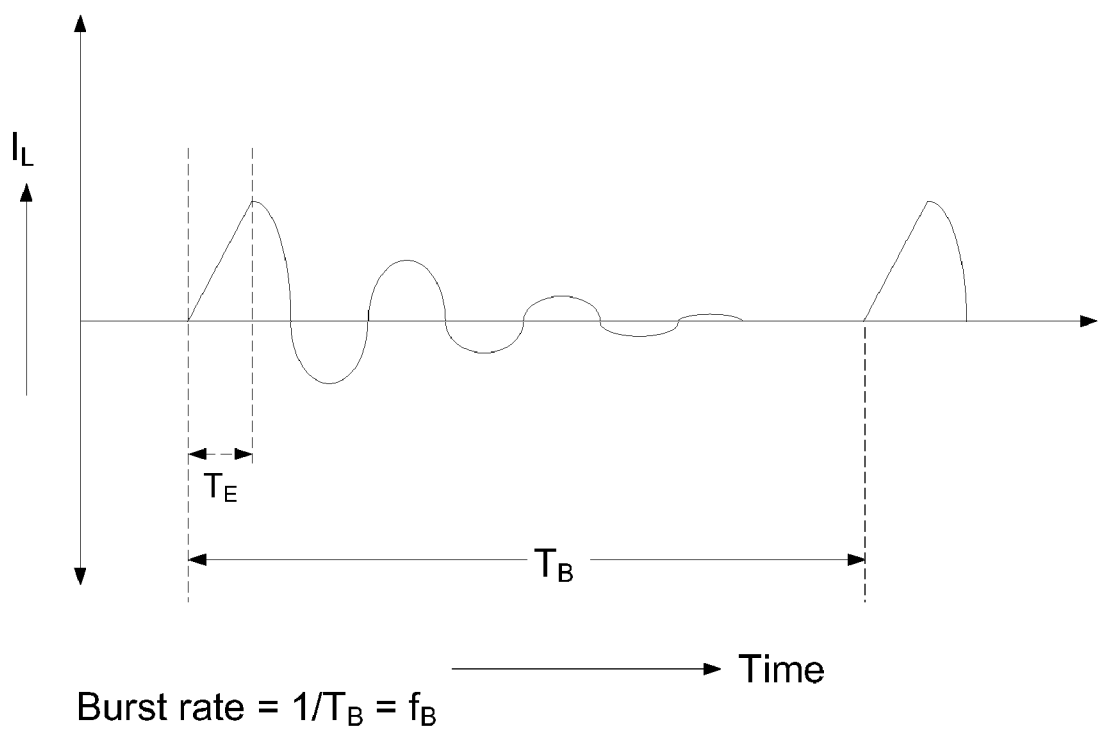
FIG. 5B shows a graph mapping the load current waveform over time according to the embodiment shown in FIG. 5A.

The circuit of FIG. 5A works in the following manner: At the beginning of the burst cycle, switch $S_E$ is turned on causing a current to flow over the path of the DC source $V_{DC}$, switch $S_E$, diode $D_E$, inductor L, and the load (if inductor L is not an induction heating load). FIG. 5B illustrates an exemplary waveform for the current during time $T_E$ when switch $S_E$ is on. When switch $S_E$ is turned off, the current in inductor L will then flow in the anti-parallel diode of switch S, the capacitor C, and back to inductor L. After switch $S_E$ is turned off, switch S is turned on. The rest of the burst cycle is like that described for FIG. 1A. The circuit is allowed to resonantly ring down to a much lower current than at the beginning of the burst cycle at which time switch S is turned off. The burst cycle is then repeated. The power delivered to the load can be controlled by how high the current goes when switch $S_E$ is on and how often the cycle is repeated.

One of the major advantages of this topology is that the conduction modulation losses of switch S are reduced significantly. Under some conditions, the conduction modulation losses are reduced to zero. The conduction modulation losses are reduced in the following manner.

When switch $S_E$ is turned off, the current will first flow through the diode anti-parallel with Switch S. If the current is high and rises at a fast rate, the voltage across the diode will be high due to the conduction modulation losses of the diode itself. If the voltage is above the breakdown voltage, the emitter-base junction of the bi-polar switch S will Zener and current will flow not only through the diode but also through Switch S. For one embodiment, the breakdown voltage is approximately 17 volts. The current flowing through switch S will saturate the collector region of switch S thus reducing the conduction modulation losses of switch S. With a high enough current and high enough resonant frequency, the conduction modulation losses will be reduced to zero. This reduces the turn on switching losses of switch S to near zero. When switch S is also turned off at a very low voltage and current as described above, the switching losses of switch S are essentially zero and therefore the circuit essentially has no frequency limit at which it can be used. This embodiment will have applications in other areas involving power electronics.

For one embodiment, a switching device can be an SCR if the time the current is in the diode is longer than the turn-off time of the SCR. Furthermore, the turn-off time of the SCR in use can be shorter than the data sheet specified turn-off time because the amount of current in the SCR just prior to the SCR turn-off time is very low and the rate of change in voltage ("dv/dt") is much lower than the specified dv/dt at turn-off. Additionally, the application of a full voltage dv/dt can be delayed relative to the time the current stops flowing in the SCR, which further reduces the turn-off time required.

In the foregoing specification, the invention has been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A high frequency resonant apparatus comprising:
   a closed loop resonant series circuit including a capacitor, an inductor, a load, and a switching device with an anti-parallel diode;
   an energy source coupled to the closed loop series circuit;
   a controller to turn on the switching device for a time long enough that current of a resonant signal flows in the closed loop resonant series circuit for at least one and a half cycles, wherein switching losses occur less than twice per cycle.

2. The apparatus of claim 1, wherein the energy source is connected to the closed loop series circuit parallel to the capacitor to pre-charge the capacitor prior to turning on the switching device.

3. The apparatus of claim 1, wherein the closed loop resonant series circuit load is an induction heating load.

4. The apparatus of claim 1, wherein the energy source comprises a series connected circuit of a DC source, an inductor, and a diode.

5. The apparatus of claim 1, wherein the energy source comprises a series connected circuit of a DC source, a switch, an inductor, and a diode.

6. The apparatus of claim 1, wherein the energy source comprises a current-sourced energy source.

7. The apparatus of claim 6, wherein the current sourced energy is an uncontrolled current source.

8. The apparatus of claim 6, wherein the current sourced energy is a controlled current source.

9. The apparatus of claim 1, wherein the energy source is connected to the closed loop series circuit parallel to the series of the inductor and the load to pre-charge the inductor prior to turning on the switching device.

10. The apparatus of claim 9, wherein current first flows through the switching device collector region before the switching device conducts forward current.

11. The apparatus of claim 9, wherein the energy source comprises a series connected circuit of a DC source, a switch, and a diode.

12. The apparatus of claim 2, wherein the closed loop resonant series circuit load is an induction heating load.

13. The apparatus of claim 4, wherein the closed loop resonant series circuit load is an induction heating load.

14. The apparatus of claim 5, wherein the closed loop resonant series circuit load is an induction heating load.

15. The apparatus of claim 6, wherein the closed loop resonant series circuit load is an induction heating load.

16. The apparatus of claim 7, wherein the closed loop resonant series circuit load is an induction heating load.

17. The apparatus of claim 8, wherein the closed loop resonant series circuit load is an induction heating load.

18. The apparatus of claim 9, wherein the closed loop resonant series circuit load is an induction heating load.

19. The apparatus of claim 10, wherein the closed loop resonant series circuit load is an induction heating load.

20. The apparatus of claim 11, wherein the closed loop resonant series circuit load is an induction heating load.

21. A high frequency resonant apparatus comprising:
a closed loop resonant series circuit including a capacitor, an inductor, a load, and a switching device with an anti-parallel diode;
an energy source coupled to the closed loop series circuit;
a controller to turn on the switching device until the current in the resonant series circuit decays down to less than one third of its original peak value at the start of the burst cycle, wherein switching losses occur less than twice per cycle.

22. The apparatus of claim 21, wherein the energy source is connected to the closed loop series circuit parallel to the capacitor to pre-charge the capacitor prior to turning on the switching device.

23. The apparatus of claim 21, wherein the energy source comprises a series connected circuit of a DC source, an inductor, and a diode.

24. The apparatus of claim 21, wherein the energy source comprises a series connected circuit of a DC source, a switch, an inductor, and a diode.

25. The apparatus of claim 21, wherein the energy source comprises a current-sourced energy source.

26. The apparatus of claim 25, wherein the current sourced energy is an uncontrolled current source.

27. The apparatus of claim 25, wherein the current sourced energy is a controlled current source.

28. The apparatus of claim 21, wherein the energy source is connected to the closed loop series circuit parallel to the series of the inductor and the load to pre-charge the inductor prior to turning on the switching device.

29. The apparatus of claim 28, wherein current first flows through the switching device collector region before the switching device conducts forward current.

30. The apparatus of claim 28, wherein the energy source comprises a series connected circuit of a DC source, a switch, and a diode.

31. The apparatus of claim 21, wherein the closed loop resonant series circuit load is an induction heating load.

32. The apparatus of claim 22, wherein the closed loop resonant series circuit load is an induction heating load.

33. The apparatus of claim 23, wherein the closed loop resonant series circuit load is an induction heating load.

34. The apparatus of claim 24, wherein the closed loop resonant series circuit load is an induction heating load.

35. The apparatus of claim 25, wherein the closed loop resonant series circuit load is an induction heating load.

36. The apparatus of claim 26, wherein the closed loop resonant series circuit load is an induction heating load.

37. The apparatus of claim 27, wherein the closed loop resonant series circuit load is an induction heating load.

38. The apparatus of claim 28, wherein the closed loop resonant series circuit load is an induction heating load.

39. The apparatus of claim 29, wherein the closed loop resonant series circuit load is an induction heating load.

40. The apparatus of claim 30, wherein the closed loop resonant series circuit load is an induction heating load.

* * * * *